United States Patent [19]

Luxon et al.

[11] Patent Number: 4,818,615

[45] Date of Patent: * Apr. 4, 1989

[54] ELONGATED MOLDING GRANULES AND INJECTION-MOLDING PROCESS EMPLOYING THEM

[75] Inventors: Bruce A. Luxon, Stamford; Malalur V. Murthy, Wethersfield; Craig W. Panasy, Black Rock, all of Conn.

[73] Assignee: American Cyanamid Company, Stamford, Conn.

[*] Notice: The portion of the term of this patent subsequent to Feb. 28, 2006 has been disclaimed.

[21] Appl. No.: 869,518

[22] Filed: Jun. 2, 1986

[51] Int. Cl.$^4$ .................. B32B 9/00; B32B 15/00; D04H 1/58

[52] U.S. Cl. .................. 428/407; 428/367; 428/372; 428/389; 428/378; 428/392; 428/395; 428/408; 523/205; 525/182; 525/186

[58] Field of Search ............. 428/403, 372, 367, 375, 428/392, 395, 379, 407, 378, 389, 408; 523/200, 201, 202, 206, 222, 205, 209; 525/186, 182; 427/385.5; 528/182

[56] References Cited

U.S. PATENT DOCUMENTS

| | | | |
|---|---|---|---|
| 2,824,780 | 2/1958 | Satterthwaite | 364/178 F |
| 2,877,501 | 3/1959 | Bradt | 264/143 |
| 3,002,804 | 10/1961 | Kilian | 264/181 |
| 3,249,411 | 5/1966 | McWilliams et al. | 428/392 X |
| 3,709,773 | 1/1973 | Hall | 428/375 |
| 3,822,333 | 7/1974 | Haruta et al. | 264/179 |
| 3,850,681 | 11/1974 | Marzocchi | 428/378 |
| 3,948,673 | 4/1976 | Chase et al. | 428/378 X |
| 3,993,805 | 11/1976 | Roberts | 427/175 |
| 4,037,011 | 7/1977 | Hattori et al. | 428/392 X |
| 4,157,420 | 6/1979 | Bourrain et al. | 428/392 |
| 4,169,186 | 9/1979 | Tazaki et al. | 428/407 |
| 4,169,911 | 10/1979 | Yoshida et al. | 428/389 X |
| 4,312,917 | 1/1982 | Hawley | 428/379 X |
| 4,340,440 | 7/1982 | Chute | 427/385.5 |
| 4,477,496 | 10/1984 | Das et al. | 427/375 |
| 4,481,249 | 11/1984 | Ebneth et al. | 428/389 X |
| 4,522,967 | 6/1985 | Sheldon et al. | 524/377 |
| 4,532,187 | 7/1985 | Hoenig et al. | 525/186 X |
| 4,547,530 | 10/1985 | McCreedy et al. | 525/186 |

Primary Examiner—Lorraine T. Kendell
Attorney, Agent, or Firm—Michael J. Kelly; Steven H. Flynn

[57] ABSTRACT

Elongated granules of reinforcing fibers extending generally parallel to each other longitudinally of the granule each of said fibers being substantially surrounded by a thermally stable, film forming thermoplastic adhesive comprising (a) a poly($C_2$-$C_6$ alkyl oxazoline) in combination with (b) a poly (vinylpyrrolidone), provide complete dispersion of the fibers in thermoplastics during an injection molding cycle, conserving physical properties and providing significantly better EMI shielding than prior art extruder compounded resin/fiber blends.

13 Claims, 2 Drawing Sheets

F I G. 3
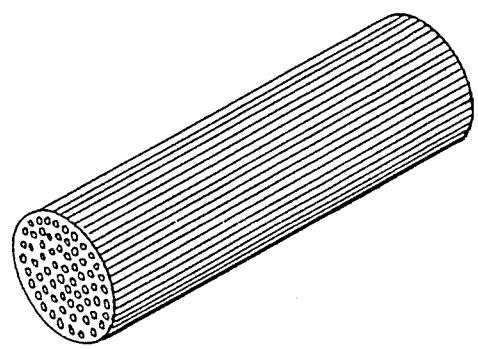
F I G. 4
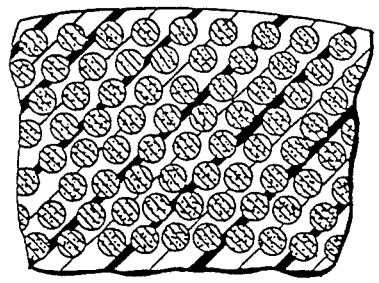

ELONGATED MOLDING GRANULES AND INJECTION-MOLDING PROCESS EMPLOYING THEM

CROSS-REFERENCE TO RELATED APPLICATION

This application is related to copending application, Ser. No. 744,363, filed on June 13, 1985, by Bruce Arthur Luxon and Malalur Venkat Murthy.

The present invention relates to reinforcing filament bundles in the form of elongated granules and to their use in dispersing fibers in thermoplastic resins during injection molding processes.

BACKGROUND OF THE INVENTION

Fiber filled plastic compounds suitable for injection molding have become widely used. The fibers impart many valuable characteristics to the injection molded articles, foremost of which are high dimensional stability, high modulus of elasticity, high resistance to distortion by heat, high tensile strength, unusually high flexural modulus and low shrinkage during curing. Glass-reinforced thermoplastic injection molding compounds and injection molding processes employing them are described in Bradt, U.S. Pat. No. 2,877,501. The technology of the Bradt patent has subsequently been extended. In addition to the styrene resins, styrene-acrylonitrile copolymer resins and styrene-butadiene copolymer resins described therein, numerous other injection-moldable thermoplastic resins, such as polycarbonate resins, acrylonitrile-butadiene-styrene terepolymer resins, poly (ethylene terephthalate) resins, polysulfone resins, polyphenylene ether resins, nylon resins, and the like, are effectively reinforced by glass fibers. Moreover, instead of glass fibers, subsequently developed commercial products are reinforced with filaments of carbon fibers, graphite fibers, aramid fibers, stainless steel filaments and others, as well as mixtures of any of the foregoing, many such products stemming directly from the technology disclosed in the above-mentioned U.S. Pat. No. 2,877,501. Such technology involves providing elongated granules, each of the granules containing a bundle of elongated reinforcing filaments extending generally parallel to each other longitudinally of the granule and a thermoplastic molding composition surrounding and permeating the bundle. In the process of injection molding, such granules are forced into a mold, wherein the filaments will be dispersed and produce molded articles with improved properties in comparison with the molded thermoplastic alone.

The above-mentioned U.S. Pat. No. 2,877,501, discloses pellets comprising 15–60 wt. % glass in thermoplastic resin, e.g., polystyrene. This corresponds to 8.1%–42.9% of filaments by volume and correspondingly 91.9–57.1% by volume of resin. Current processes for making such prior art filamentfilled granules require a compounding/pelletizing step, in which the thermoplastic material is mixed with filaments, usually chopped bundles of filaments, and usually in an extruder, then the extrudate is chopped into molding granules. Such equipment is not readily available to the molder, and a number of specialty compounders have established businesses in which fibers from one source, and thermoplastics from another source are formulated into granules in drums or truckloads for sale to molders. It would be desirable to by-pass such compounders and permit molders to feed mixtures of thermoplastics and fibers directly into the molding press hopper achieving fiber dispersion by shear forces at the screw, nozzle, check valve, runners, gates, etc. in the injection molding machine. It would also be desirable to use, in comparison with the prior art, much less resin in the pellets, e.g., 2.5–32.5% by volume (instead of 57.1–91.9%) and much higher filament loadings, e.g, 67.5–97.5% by volume (instead of 8.1–42.9% by volume). However, until the present invention, this has not been possible because the fiber or filament bundles separate during chopping and tumbling with the reduced volume fractions of resin. There is also a tendency for the resin to degrade if the temperature is raised to lower viscosity and enhance dispersion. Moreover, individual fibers can become airborne and cause problems in handling.

The above-mentioned patent application discloses improved elongated granules which solve such problems by substituting for the thermoplastic matrix separating and coating the fiber bundles, as in the prior art, a much thinner layer of an efficient thermoplastic adhesive, which acts as a binder. However, although the poly ($C_2$–$C_6$ alkyl oxazoline) binder used in the above-mentioned application holds the fiber bundle together sufficiently to prevent broken bundles during chopping into elongated pellets and tumbling with the resin to be reinforced and then readily breaks down in the presence of molten resin and thereafter does not interfere with fiber dispersion, or degrade the resin properties, or constitute-an environmental hazard, one drawback has developed and this is a tendency to prematurely break apart or "bird's nest" when high speed aggressive blending equipment is used.

Because the molding process itself is used to disperse the fibers uniformly throughout the molded part and the melt-blending compounding/pelleting step is to be strictly avoided, it is obviously important to maintain fiber bundle integrity prior to the dispersion step.

The present invention has, as its principal object, the provision of a means to keep the bundles together during dryblending in high speed production machinery. As a result, when using electrically conductive fibers, such as nickel coated graphite fibers, superior electromagnetic shielding can be provided at vastly increased rates of production at equal load levels (compared with compounded pellets), providing better shielding at one-half the cost, and, in comparison with the use of conductive, e.g., silver, paint there is much less or no secondary finishing with equivalent or better shielding, far superior physical properties, and superior long-term reliability.

DESCRIPTION OF THE DRAWING

In the drawing,

FIG. 3 is a somewhat idealized isometric view, on an enlarged scale, of a molding granule according to this invention, showing closer packing and no overcoat;

FIG. 4 is a somewhat idealized, fragmental cross-section of a molding granule of this invention on a still further enlarged scale;

SUMMARY OF THE INVENTION

Figure 1:
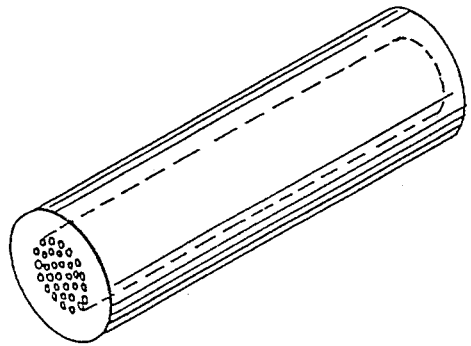
FIG. 1 is a somewhat idealized isometric view, on an enlarged scale, of a molding granule of the prior art.

In accordance with the invention, there are provided injection molding compounds comprising elongated granules, each of the granules containing a bundle of elongated reinforcing filaments extending generally parallel to each other longitudinally of the granule and substantially uniformly dispersed throughout the granule in a thermally stable, film forming thermoplastic adhesive comprising (a) a poly($C_2$-$C_6$ alkyoxazoline) in combination with (b) a poly (vinylpyrrolidone), said adhesive substantially surrounding each filament.

Also contemplated by the invention are mixed injection molding compositions comprising:

(i) thermoplastic resin molding granules; and (ii) elongated granules comprising 67.5-97.5% by volume of reinforcing filaments extending generally parallel to each other longitudinally of each of the granules and substantially uniformly dispersed throughout the granule in from 2.5 to 32.5% by volume of a thermally stable, film forming thermoplastic adhesive comprising (a) a poly($C_2$-$C_6$ alkyoxazoline) in combination with (b) a poly (vinylpyrrolidone), the amount of component (ii) in the composition being sufficient to provide 1-60% by weight of the filaments per 100% by weight of (i) plus (ii).

It is a further feature of the invention to provide a method of manufacturing an injection molding compound comprising the steps of continuously passing reinforcing filaments through one or more baths of a thermally stable, film forming thermoplastic adhesive in a solvent, e.g., water, to impregnate the filaments, passing the impregnated filaments through means such as a sized opening or over grooved rollers to remove any excess adhesive, passing the impregnated filaments into a heating zone first to evaporate the solvent and then to flux the thermoplastic adhesive, and withdrawing the treated filaments from the heating zone and thereafter chopping them into elongated granules, whereby there are produced granules comprising 67.5-97.5% by volume of reinforcing filaments extending generally parallel to each other longitudinally of the granule, substantially uniformly dispersed throughout said granule in from 2.5-32.5% by volume of the thermally stable, film forming thermoplastic adhesive combination as above defined which substantially surrounds each said filament.

In still another aspect, the present invention contemplates, as an improvement in the process of injection molding, the step of forcing into a mold an injection molding composition comprising a blend of:

(i) thermoplastic molding granules; and (ii) an amount effective to provide reinforcement of elongated granules, each of the granules containing a bundle of reinforcing filaments extending generally parallel to each other longitudinally of the granule substantially uniformly dispersed in a thermally stable, film forming thermoplastic adhesive comprising (a) a poly($C_2$-$C_6$ alkyoxazoline) in combination with (b) a poly (vinylpyrrolidone), said adhesive substantially surrounding each said filament.

DETAILED DESCRIPTION OF THE INVENTION

Figure 2:
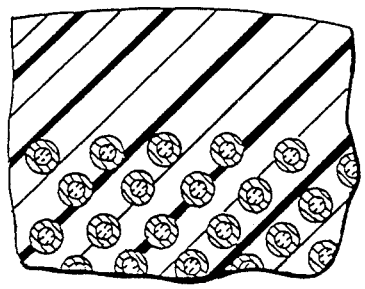
FIG. 2 is a somewhat idealized, fragmental crosssection of a molding granule of the prior art on a still further enlarged scale.

Referring to the drawing, FIGS. 3 and 4, each filament contained in the injection molding granule is surrounded by and the bundle is impregnated by the thermally stable, film-forming thermoplastic adhesvie combination. The pellet itself may be of cylindrical or rectangular or any other cross-sectional configuration, but preferably is cylindrical. The length of the granules can vary, but for most uses, ⅛ inch-¾ inch will be acceptable and ⅛ inch-¼ inch will be preferred. The differences between the pellets of this invention and those of the prior art can be seen by comparison of FIG. 1 with FIG. 3 and FIG. 2 with FIG. 4, respectively. Unlike the prior art (FIGS. 1 and 2) the pellets of this invention have close-packed filaments and the thermoplastic adhesive jacket is substantially dispersed upon contact with hot molten thermoplastic in the present invention. On the other hand, the prior art pellets will not readily separate into reinforcing filaments because of interference by the relatively thick jacket of thermoplastic resin.

Instead of using a lot of resin to impregnate the fiber bundle and surround it, as is done in the prior art, it is essential to use an adhesive efficient for the purposes of the invention, and that is to bind a high proportion of filaments into each elongated granule and maintain them throughout the chopping process and any subsequent blending steps in high speed, high throughput machines. The adhesive preferably will be used also in an amount which is not substantially in excess of that which maintains the fiber bundle integrity during chopping. This amount will vary depending on the nature of the fibers, the number of fibers in the bundle, the fiber surface area, and the efficiency of the adhesive, but generally will vary from 2.5 to 32.5% and preferably from 5 to 15% by volume of the granule.

For uniform adhesive pick up on the fibers in the bundle it is preferred to use a small, but effective amount of a conventional surface active agent, which facilitates wetting and bonding to numerous different substrates. Anionic, cationic and non-ionic surfactants are suitable for this purpose, the only requirement being that they be miscible with any solvent system used for impregnation and compatible with the thermoplastic film forming adhesive combination. Preferred surfactants, especially when graphite, or metal coated carbon fiber substrates are used, comprise anionic surfactants especially sodium salts of alkyl sulfuric acids. Particularly useful is sodium hepadecyl sulfate, sold by Union Carbide Co., under the Trademark NIACET ® No. 7.

Careful consideration should be given to selection of the film forming thermoplastic adhesive combination, subject to the above-mentioned parameters. Some adhesives are more efficient than others, and some, which are suggested for use as fiber sizings in the prior art will not work. For example, poly(vinyl acetate) and poly(vinyl alcohol), the former being suggested by Bradt in U.S. Pat. No. 2,877,501, as a sizing, do not work herein because, it is believed, thermosetting or cross linking occurs and this operates to prevent rapid melting and complete dispersion in the injection molding machine. While such materials are suitable for the resin rich compounded granules used in the Bradt patent, they are unsuitable herein.

Much preferred for use herein is a combination comprising poly ($C_2$–$C_6$ alkyl oxazolines) and poly (vinylpyrrolidone). The former is somewhat structurally related to N,N-dimethylformamide (DMF) and have many of its miscibility properties. A readily available such polymer is poly(2-ethyl oxazoline), Dow Chemical Co. PEOx. This can also be made by techniques known to those skilled in this art. Poly(2-ethyl oxazoline) is thermoplastic, low viscosity, water-soluble adhesive. It can be used in the form of amber-colored and transparent pellets 3/16" long and ⅛" diameter. Typical molecular weights are 50,000 (low); 200,000 (medium) and 500,000 (high). Being water soluble, it is environmentally acceptable for deposition from aqueous media. It also wets the fibers well because of low viscosity. It is thermally stable up to 380° C. (680° F.) in air at 500,000 molecular weight. Poly(vinylpyrrolidone) is an item of commerce, being widely available from a number of sources, and varying in molecular weight, as desired. While the poly(oxazoline) appears to provide dispersibility to the elongated bundles, the poly(vinylpyrrolidone) is useful for high temperature resistance. Like the oxazoline, poly(vinylpyrrolidone) works well in water based impregnation media. Typical molecular weight ranges readily availabe can be used, for example 10,000; 24,000; 40,000; and 220,000. The higher molecular weight material tends to provide bundles which are more difficult to disperse. On the other hand, the lowest molecular weight causes some loss in heat resistance. However, within the foregoing parameters, the adhesive combination on fiber bundles does not fracture appreciably during chopping to minimize free filaments from flying about, which can be a safety hazard. When blended with pellets of a thermoplastic resin system, the adhesive combination will melt readily allowing complete dispersion of the fibers throughout the resin melt while in a molding machine. However, pellets bound with this thermoplastic adhesive combination are indefinitely stable with the resin pellets during blending, and don't break apart prematurely.

As a result of a number of trials, the invention as currently practiced provides optimum results when the following guidelines are adhered to:

The fiber type can vary, any fiber being known to be useful as a filler or reinforcement in a resin system can be used. Preferred fibers are carbon or graphite fibers, glass fibers, aramid fibers, stainless steel fibers, metal coated graphite fibers, or a mixture of any of the foregoing.

The preferred thermoplastic adhesive component (a) comprises poly(ethyloxazoline), having a molecular weight in the range of about 25,000 to about 1,000,000, preferably 50,000–500,000, most preferably about 50,000.

The preferred thermoplastic adhesive component (b) comprises poly(vinylpyrrolidone), having a molecular weight in the range of from about 10,000 to about 220,000, preferably from about 24,000 to about 40,000 and most preferably about 24,000.

It is preferred that the adhesive be deposited onto the filaments from a solvent system which can comprise any polar organic solvent, e.g., methanol, or mixture of such solvents, or water, alone, or in admixture. Acceptable bath concentrations for the thermoplastic adhesive can vary but is generally for component (a) it is in the range of 2.5–12% by weight, preferably 2.5–8%, and especially preferably 4–8% by weight and, for component (b), in the range of 1–8% by weight, preferably 1–6% by weight, and, especially preferably, 1–4% by weight.

If a surface active agent is used, this too can vary in type and amount, but generally if an anionic alkyl sulfate is used, such as sodium heptadecyl sulfate, bath concentrations can range from 0.0005–0.5% by weight, preferably from 0.0005 to 0.05%, and most preferably, 0.0005–0.005%, by weight.

The amount of non-filament material in the filament-containing granules of the invention will vary, but, in general, will range from 2.5 to 32.5% by volume with any fiber, preferably from 5 to 15% by volume.

The amount of component (b) will be from about 7.5 to about 75% by weight based on the combined weights of (a) and (b) preferably from about 15% to about 50%.

The length of the elongated granule will generally range from ⅛ to ¼ inch, preferably from ⅛ to ¾ inch. The diameters of each elongated granule can vary, depending primarily on the number of filaments and the thicknesses will vary from about one-forty eighth to about three-sixteenths inch in diameter. Preferably, the diameter will be in the range of from about one-thirty-second to about one-eighth inches.

Numerous thermoplastic resins can be employed with the elongated granules of the present invention. In general any resin that can be injection molded and that can benefit from a uniform dispersion of fibers can by used. For example polystyrene, styrene/acrylic acid copolymer, styrene/acrylonitrile copolymer, polycarbonate, poly (methyl methacrylate) poly(acrylonitrile/-butadiene/styrene), polyphenylene ether, nylon, poly(1,4-butylene terephthalate), mixtures of any of the foregoing, and the like, can be used.

Figure 5A:
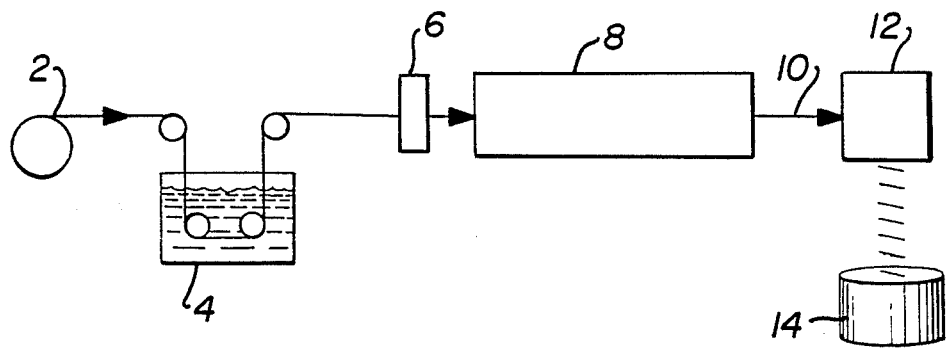
FIG. 5a is a semi-schematic diagram showing a preferred way-of making the elongated molding pellets of this invention.

It is preferred to manufacture the injection molding composition of this invention by a continuous process. A suitable apparatus is shown in FIG. 5a. Typically, bundles of filaments, such as graphite fiber tows or metal coated graphite fiber tows, 3,000 to 12,000 filaments per bundle, glass yarns, 240 filaments to a strand, or stainless steel tow, 1159 filaments per bundle, are drawn from storage roller 2 and passed through one or more baths 4, containing the thermally stable, film forming thermoplastic adhesive in a solvent medium, e.g., water, to impregnate the filaments, then through means such as die 6, to control pick up. The impregnated filaments thereafter are passed into a heating zone, e.g., oven 8, to evaporate the solvent, e.g., water and then to flux the thermoplastic adhesive. The treated filaments 10 are withdrawn from the heated zone, transported to chopper 12 and cut into fiber pellets illustratively varying between ⅛–¼" according to the requirements of the particular apparatus. The pellets are then stored in a suitable container 14 for subsequent use. Any surfactant conveniently is included in a single bath with the adhesive. It will be observed that this procedure results in the orientation of the reinforcing fibers along one axis of the granule.

Figure 5B:
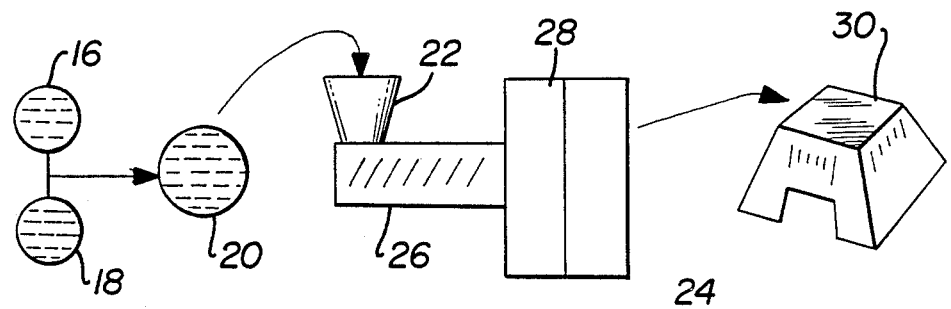
FIG. 5b is a semi-schematic drawing illustrating the way in which the pellets of this invention are mixed and molded into shaped articles.

To carry out the molding method of the present invention, a flow diagram in the general form illustrated in FIG. 5b is preferably employed. Fiber pellets 16 are mixed with resin pellets 18 to produce a blended mixture 20. This is added to conventional hopper 22 on molding press 24. When passing through cylinder 26, prior to being forced into mold 28 a uniform dispersion of the fibers is accomplished. Removal of molded article 30 provides a fiber reinforced item produced according to this invention.

It is understood that other plasticizers, mold lubricants, coloring agents, and the like, can be included, and that the amount of reinforcement in the components can be varied according to well understood techniques in this art.

DESCRIPTION OF THE PREFERRED EMBODIMENTS

The following are examples of the present invention but are not to be construed to limit the claims in any manner whatsoever. The electrical measurements (Shielding effectiveness (SE) values in decibels) are averages usually of four samples.

EXAMPLE 1

Using an apparatus of the type generally shown in FIG. 5a a bath comprising the following is formulated:

| Component | % by weight |
| --- | --- |
| poly(ethyl oxazoline), MW 50,000 | 6.0 |
| poly(N-vinylpyrrolidone), MW 24,000 | 4.0 |
| sodium heptadecyl sulfate* | 0.001% |
| water | 89.899 |

* NIACET ® No. 7 surfactant

A tow of continuous graphite fibers (12,000 count) each of which has an electroplated nickel coating thereon is led through the bath. The graphite filaments each average about 7 microns in diameter. The nickel-coating thereon is approximately 0.5 microns in thickness. The nickel coated graphite tows are prepared by continuous electroplating in accordance with the prcedure described in European Patent Application No. 0088884 (published Sept. 21, 1983). After passing out of the coating bath the treated fibers are passed over grooved rollers to remove excess adhesive then passed through an oven at about 300° F. The impregnated filaments then are chopped to ¼" lengths and there are produced elongated granules of approximately 1/16" in diameter of cylindrical shape and form. The non-filament material content is 9% by volume.

EXAMPLES 2-3

The procedure of Example 1 is repeated, adjusting the poly(vinylpyrrolidone) content in the bath to 2% and 6% by weight, respectively, and elongated granules according to this invention are produced.

EXAMPLES 4-6

Using the process generally shown in FIG. 5b, sufficient of the elongated pellets produced in Examples 1, 2 and 3, respectively, are blended with pellets of a thermoplastic molding resin composition comprising poly(bisphenol A carbonate) (Mobay Co. MERLON® 6560) to provide 5 weight percent of nickel-coated graphite filaments in the blend. The blended mixture is molded in an injection molding press into work pieces suitable for physical and electrical testing. The electromagnetic shielding effectiveness (SE) and EMI attenuation are measured to determine dispersion efficiency.

The Electro-Metrics Dual Chamber test fixture is used according to ASTM ES7-83 to measure the shielding effectiveness (SE) of the compositions of Examples 4-6 of this invention. The results are set forth in Table 1:

TABLE 1

Shielding Effectiveness Poly(bisphenol-A Carbonate) Containing Nickel-Plated Graphite Filaments

| | EXAMPLE | | |
| --- | --- | --- | --- |
| Composition (parts by weight) | 4 | 5 | 6 |
| Poly(bisphenol A carbonate) | 95 | 95 | 95 |
| Elongated film bonded bundles (Examples 1-3) | 5 | 5 | 5 |
| Shielding Effectiveness, decibels @ | | | |
| 30 MHz | 20 | 13 | 15 |
| 100 MHz | 17 | 12 | 13 |
| 300 MHz | 33 | 31 | 31 |
| 1000 MHz | 12 | 10 | 11 |

*Controls

These data demonstrate that the fibers are uniformly and efficiently dispersed.

EXMPLE 7

The procedure of Examples 4-6 is repeated substituting for the thermoplastic resin pellets, pellets comprising poly(acrylonitrile/butadiene/styrene) (Borg Warner CYCOLAC® KJB) resin and plaques suitable for measuring SE effect are molded.

EXAMPLE 8

The procedure of Example 4-6 is repeated but poly(2,6-dimethyl-1,4-phenylene ether)-high impact strength rubber modified polystyrene resin pellets (General Electric NORYL® N-190) are substituted, and plaques suitable for measuring SE are prepared.

EXAMPLES 9-11

The procedure of Example 1 is repeated, substituting for the nickel coated graphite tows, tows of uncoated graphite fibers (Example 9), glass fibers, 240 filaments/strand (Example 10), and stainless steel fiber tows comprising 1159 count filaments each measuring about 7 microns in diameter (Example 11). Elongated granules according to this invention are prepared, comprising about 85 to 95% by volume of the respective filaments.

EXAMPLES 12-14

The procedure of Examples 1-3 and 4-6 are repeated but poly(N-vinyl pyrrolidone), MW 40,000 is substituted for the 24,000 molecular weight PVP. Plaques for measuring SE properties and test pieces for strength testing are prepared.

The Shielding Effectiveness of the compositions molded from the mixtures of Examples 12, 13 and 14 are measured by ASTM ES7-83 as described above and the data are set forth in Table 2:

TABLE 2

Shielding Effectiveness of Polycarbonate Resins Containing Nickel Coated Graphite Fibers

| | EXAMPLE | | |
| --- | --- | --- | --- |
| Composition (parts by weight) | 12 | 13 | 14 |
| Poly(bisphenol A carbonate) | 95 | 95 | 95 |
| Nickel coated graphite elongated film bonded bundles (4%, 2%, 6% PVP) | 5 | 5 | 5 |
| Shielding Effectiveness, decibels @ | | | |
| 30 MHz | 16 | 18 | 17 |
| 100 MHz | 14 | 15 | 15 |
| 300 MHz | 38 | 36 | 39 |

TABLE 2-continued

Shielding Effectiveness of Polycarbonate Resins Containing Nickel Coated Graphite Fibers

| Composition (parts by weight) | EXAMPLE | | |
|---|---|---|---|
| | 12 | 13 | 14 |
| 1000 MHz | 11 | 11 | 11 |

Again, significant shielding effectiveness is obtained after using the bundles bonded according to the present invention.

In making the elongated pellets of this invention, other fibers can be substituted, e.g., aramid fiber, e.g., KEVLAR ® fiber, ceramic fiber, or combinations of any of the foregoing such fibers. Aramid fiber is particularly interesting because it is virtually impossible to chop and blend with thermoplastic resins because it frays and birdnests. When prepared in the form of coated bundles herein, aramid fiber chops very well and mixes easily.

The foregoing examples show that poly(vinylpyrrolidone) (PVP) alloyed with poly(ethyloxazoline) is very useful to provide elongated granules according to this invention. Experiments have shown that various molecular weights can be used. Experiments also have shown that PVP is useful to reduce tack at elevated temperatures, while at the same time aiding significantly in the preservation of bundle integrity. It has also been observed that toughness increases as the molecular weight of the PVP increases. This property is useful when compounding at high temperature, with rapid drying, or under aggressive handling conditions.

The foregoing patents and publications are incorporated herein by reference.

Many variations of the present invention will suggest themselves to those skilled in the art in light of the foregoing detailed description. All such obvious variations are within the full intended scope of the appended claims.

We claim:

1. An injection molding compound comprising elongated granules, each of said granules containing a bundle of elongated reinforcing filaments extending generally parallel to each other longitudinally of the granule and substantially uniformly dispersed throughout said granule in a thermally stable, film forming thermoplastic adhesive comprising
   (a) a poly($C_2$-$C_6$ alkyl oxazoline) in combination with
   (b) a poly(vinylpyrrolidone), said adhesive substantially surrounding each said filament said reinforcing filaments being present in an amount of from 67.5–97.5% by volume and said adhesive being present in an amount of from 2.5 to 32.5% by volume.

2. An injection molding compound as defined in claim 1 wherein component (b) comprises from about 7.5 to about 75 percent by weight of component (a) and component (b) combined.

3. An injection molding compound as defined in claim 1 wherein said granules are from about one-forty eighth to about three-sixteenths inches in diameter.

4. An injection molding compound as defined in claim 3 wherein said granules are from about one-thirty second to about one-eighth inches in diameter.

5. An injection molding compound as defined in claim 1 wherein the reinforcing filaments are present in an amount of 85% to 95% by volume and said adhesive is present in an amount from 5–15% by volume.

6. An injection molding compound as defined in claim 1 wherein said reinforcing filaments comprise graphite fibers, glass fibers, aramid fibers, stainless steel fibers, metal coated graphite fibers or a mixture of any of the foregoing.

7. An injection molding compound as defined in claim 6 wherein the reinforcing filaments comprise graphite fibers.

8. An injection molding compound as defined in claim 7 wherein the reinforcing filaments comprise nickel coated graphite fibers.

9. An injection molding compound as defined in claim 1 wherein the thermoplastic adhesive comprises poly(ethyl oxazoline).

10. An injection molding compound as defined in claim 9 wherein the poly(ethyl oxazoline) has a molecular weight in the range of from about 50,000 to about 500,000.

11. An injection molding compound as defined in claim 1 wherein the thermoplastic adhesive comprises poly(ethyl oxazoline) and poly(vinylpyrrolidone).

12. An injection molding compound as defined in claim 11 wherein the poly(vinylpyrrolidone) has a molecular weight in the range of from about 10,000 to about 220,000.

13. An injection molding composition comprising:
   (i) thermoplastic resin molding granules; and
   (ii) elongated granules comprising 67.5–97.5% by volume of reinforcing filaments extending generally parallel to each other longitudinally of each of said granules and substantially uniformly dispersed throughout said granule in from 2.5–32.5% by volume of a thermally stable, film forming thermoplastic adhesive comprising
      (a) a poly ($C_2$-$C_6$ alkyl oxazoline) in combination with
      (b) a poly(vinylpyrrolidone), the amount of component (ii) in said composition being sufficient to provide 1–60% by weight of said filaments per 100% by weight of (i) plus (ii).

* * * * *